(12) United States Patent
Jin et al.

(10) Patent No.: US 11,325,841 B2
(45) Date of Patent: May 10, 2022

(54) PREPARATION METHOD OF INDIUM OXIDE WITH STABLE MORPHOLOGY AND APPLICATION THEREOF

(71) Applicant: Shanghai Jiao Tong University, Shanghai (CN)

(72) Inventors: Han Jin, Shanghai (CN); Daxiang Cui, Shanghai (CN); Cuili Xue, Shanghai (CN); Yuna Zhang, Shanghai (CN); Yuli Xv, Shanghai (CN); Yuan Zhou, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 17/483,124

(22) Filed: Sep. 23, 2021

(65) Prior Publication Data

US 2022/0098052 A1    Mar. 31, 2022

(30) Foreign Application Priority Data

Sep. 25, 2020  (CN) .......................... 202011021701.5

(51) Int. Cl.
  *C01G 15/00*  (2006.01)
  *G01N 27/406*  (2006.01)
  (Continued)

(52) U.S. Cl.
  CPC .............. *C01G 15/00* (2013.01); *B22F 1/142* (2022.01); *B22F 9/04* (2013.01); *G01N 27/301* (2013.01);
  (Continued)

(58) Field of Classification Search
  None
  See application file for complete search history.

(56) References Cited

U.S. PATENT DOCUMENTS

2007/0249879 A1*  10/2007  Iaccino ..................... C07C 2/84
                                                    585/418
2017/0040470 A1*  2/2017  Cheng ...................... H01B 1/22
                                  (Continued)

FOREIGN PATENT DOCUMENTS

CN    106927828 A  *  7/2017
CN    110156069 A     8/2019

OTHER PUBLICATIONS

English translation of CN 106927828 (originally published Jul. 7, 2017) obtained from Espacenet.*
(Continued)

*Primary Examiner* — George Wyszomierski
(74) *Attorney, Agent, or Firm* — WPAT, PC

(57) ABSTRACT

A preparation method of indium oxide with stable morphology includes: (1) mixing indium oxide powder and bismuth oxide powder according to a mass ratio of 1:0.1-0.5 to obtain a powder mixture; (2) putting the powder mixture into a ball mill for ball milling at room temperature to obtain a uniform powder mixture; (3) putting the obtained uniform powder mixture into a muffle furnace and calcining at 700-1000° C.; and (4) obtaining the indium oxide with cubic stable morphology after the muffle furnace naturally cools to room temperature. The method has advantages of simple synthesis process, short synthesis period, high sample yield, no need of complicated equipment, and morphology of the obtained indium oxide can be maintained after being heated at a high temperature within 1000° C. for 2 hours. An electrochemical sensor prepared by using the indium oxide obtained by the method has better selectivity to nonane.

7 Claims, 9 Drawing Sheets

(51) Int. Cl.
　　　*B22F 9/04*　　　(2006.01)
　　　*G01N 27/30*　　　(2006.01)
　　　*G01N 27/333*　　　(2006.01)
　　　*B22F 1/142*　　　(2022.01)

(52) U.S. Cl.
　　　CPC ......... *G01N 27/333* (2013.01); *G01N 27/406* (2013.01); *B22F 2009/043* (2013.01); *B22F 2302/25* (2013.01); *C01P 2004/38* (2013.01)

(56) References Cited

U.S. PATENT DOCUMENTS

2018/0330854 A1* 11/2018 Hill .................... C01G 49/0018
2019/0313944 A1* 10/2019 Sun ........................ A61B 5/097

OTHER PUBLICATIONS

English translation of CN 110156069 (originally published Aug. 23, 2019) obtained from Espacenet.*
Zhu Weixue et al., "Characteristics Study of the Zirconia-Based Amperometric Gas Sensors Response to the PPB-Level Concentration of NO", Chinese Journal of Sensors and Actuators, Nov. 2015, vol. 28, No. 11, pp. 1596-1601.

* cited by examiner

PREPARATION METHOD OF INDIUM OXIDE WITH STABLE MORPHOLOGY AND APPLICATION THEREOF

TECHNICAL FIELD

The invention relates to indium oxide with stable morphology, in particular to a preparation method of indium oxide with stable morphology and an application thereof.

BACKGROUND

As a semiconductor functional material, indium oxide ($In_2O_3$) has wide band gap, low resistivity and high catalytic activity, and has been widely used in photoelectric fields, gas sensors and catalysts. As the structure and morphology of indium oxide directly affect its performance, the preparation of indium oxide with special structure and morphology is the key technology to regulate its performance. In recent years, researchers have devoted themselves to regulating the structure and morphology of indium oxide materials to enhance their properties. The preparation methods mainly include chemical vapor deposition method, sputtering method, sol-gel method, microemulsion method, homogeneous precipitation method, hydrothermal method, electrospinning method and so on. The prepared indium oxide materials with different structures and morphologies include quantum dots, nano cuboids, nanowires, nanobelts, nanotubes, nanofibers, nanocrystalline chains, multi-stage broad bean shapes and microspheres, etc. However, although the chemical vapor deposition method can synthesize nano indium oxide with different morphologies and excellent properties, it is difficult to realize industrial production because of its high requirements for adjusting various equipment parameters and small sample size. The commonly used liquid phase method has long process flow and large equipment consumption. In addition, indium oxide with special structure and morphology, such as rectangular indium oxide, has poor thermal stability. When preparing the sensor, its structure and morphology are easy to change in the environment higher than 300° C., that is, the structure and morphology of indium oxide are easy to be destroyed at high temperature and lose its specific performance, which directly limits the wide application of indium oxide with specific structure and morphology in different working environments. On the premise of ensuring the thermal stability of indium oxide structure and morphology, it is an urgent problem to synthesize indium oxide with specific structure and morphology by simple synthesis method.

SUMMARY

Technical problems to be solved by the invention are to provide a preparation method of indium oxide with fixed morphology, which has simple process, high success rate and good thermal stability of morphology, and to provide an application of the indium oxide.

According to one of technical schemes adopted by the invention to solve the above technical problems, a preparation method of indium oxide with stable morphology includes the following steps:

(1) mixing indium oxide powder and bismuth oxide powder according to a mass ratio of 1:0.1-0.5 to obtain a powder mixture;

(2) putting the above powder mixture into a ball mill for ball milling at room temperature to obtain a uniform powder mixture;

(3) putting the obtained uniform powder mixture into a muffle furnace and calcining at 700-1000° C.;

(4) obtaining the indium oxide with stable morphology after the muffle furnace naturally cools to room temperature. After that, the obtained indium oxide with stable morphology can be applied onto an electrochemical sensor.

In an embodiment, time of the ball milling is more than 2 hours, and time of the calcining is more than 1 hour.

According to a second technical scheme adopted by the invention to solve the above technical problems, an electrochemical sensor using the indium oxide with stable morphology prepared by the above method includes a YSZ (yttria-stabilized zirconia) solid electrolyte layer, a heating plate, a reference electrode and a sensitive electrode. A lower end face of the YSZ solid electrolyte layer is attached to and fixedly connected to an upper end face of the heating plate, and the reference electrode and the sensitive electrode are respectively in square shapes with the same size; the reference electrode and the sensitive electrode are distributed on an upper end face of the YSZ solid electrolyte layer at intervals, and the reference electrode is provided with a reference electrode lead, while the sensitive electrode is provided with a sensitive electrode lead, and the sensitive electrode is made of the indium oxide with cubic stable morphology.

In an embodiment, a material of the reference electrode is manganese dioxide, and a material of the heating plate is alumina.

In an embodiment, both the YSZ solid electrolyte layer and the heating plate are rectangular, and sides of the YSZ solid electrolyte layer and the heating plate are equal in length.

In an embodiment, a length of YSZ solid electrolyte layer is 1.3 cm-1.7 cm, a width of YSZ solid electrolyte layer is 0.3 cm-0.5 cm, a thickness of YSZ solid electrolyte layer is 1 mm-3 mm, a thickness of the heating plate is 1.1 mm-1.5 mm; a length of the reference electrode is 2 mm-3 mm, a width of the reference electrode is 0.3 cm-0.5 mm, and a thickness of the reference electrode is 14 μm-16 μm.

In still another aspect, a preparation method of the electrochemical sensor includes the following steps:

(1) preparing the YSZ solid electrolyte layer and the heating plate with corresponding sizes according to design size requirements;

(2) mixing terpineol and ethylcellulose according to a mass ratio of 94:6 to prepare terpineol slurry;

(3) putting a reference electrode material powder and the terpineol slurry into an agate mortar according to a mass ratio of 1:1.5, mixing and grinding uniformly to thereby form first slurry;

(4) printing the first slurry on a design position of the reference electrode on the upper end face of the YSZ solid electrolyte layer according to a design size by adopting a screen printing method/technology to obtain a prototype reference electrode;

(5) putting the product obtained in step (4) into a drying oven, drying at 130° C. for 12 h, then putting into a sintering furnace, sintering at 1400° C. for 2 hours for molding and subsequently cooling to room temperature to thereby form the reference electrode on the upper end surface of the YSZ solid electrolyte layer;

(6) putting the indium oxide with cubic stable morphology and the terpineol slurry according to a mass ratio of 1:1.5 into an agate mortar, mixing and grinding uniformly to form second slurry;

(7) printing the second slurry on a design position of the sensitive electrode on the upper end face of the YSZ solid electrolyte layer according to a design size by adopting a screen printing technology to obtain a prototype sensitive electrode;

(8) spot coating Pt paste on surfaces of the reference electrode and the prototype sensitive electrode, and then leading out the reference electrode lead and the sensitive electrode lead through the Pt paste;

(9) putting the product processed in step (8) into a drying oven, drying for 12 hours at 130° C., then taking out and putting in a sintering furnace, sintering for 2 hours at 900° C. for molding, and taking out for cooling to room temperature to thereby obtain the sensitive electrode; and

(10) placing the heating plate under the YSZ solid electrolyte layer in the product obtained after being processed in step (9), and adhering the heating plate and the YSZ solid electrolyte layer together by adopting a high-temperature resistant adhesive to prepare the electrochemical sensor.

Compared with the prior art, the method may have the advantages of simple synthesis process, short synthesis period (samples can be obtained within 2 h), high sample yield (the yield can reach 95%), no need of complex equipment, and the morphology of the obtained indium oxide can be maintained after being heated at a high temperature within 1000° C. for 2 hours; and meanwhile, the electrochemical sensor prepared by using the cubic indium oxide obtained by the method has better selectivity to nonane.

DETAILED DESCRIPTION OF EMBODIMENTS

Figure 1A:
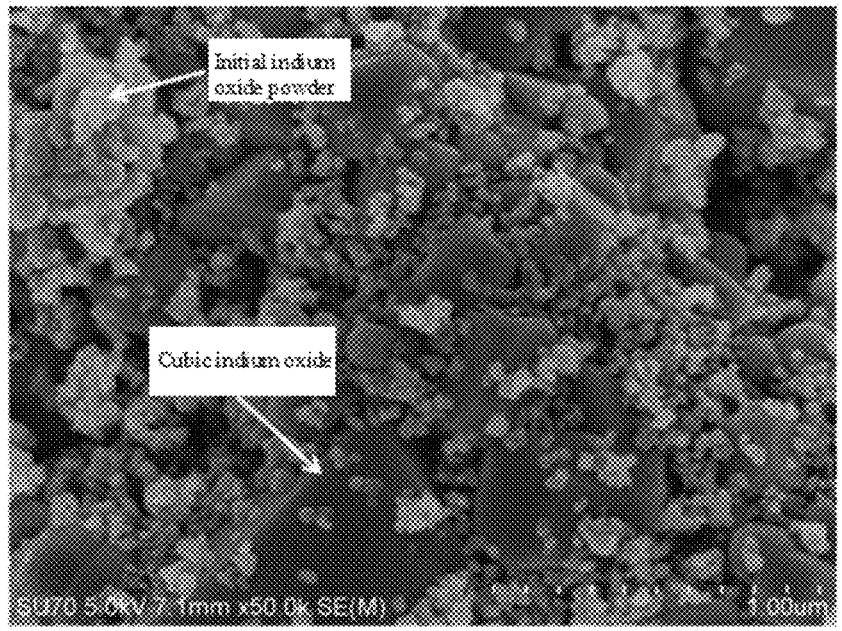
FIG. 1A is a scanning electron microscope picture of indium oxide with cubic stable morphology obtained by mixing indium oxide and bismuth oxide with a mass ratio of 10% according to a synthetic process of the invention.
Figure 1B:
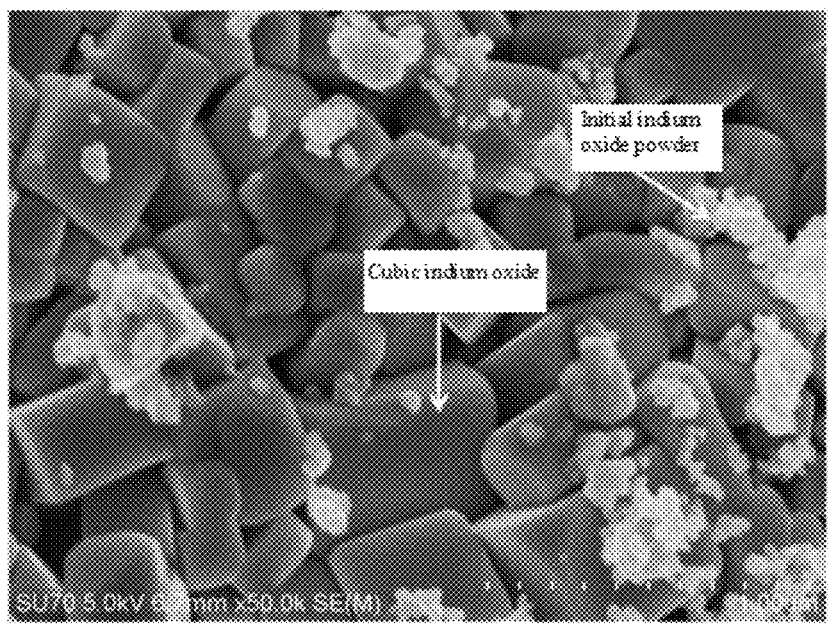
FIG. 1B is a scanning electron microscope picture of indium oxide with cubic stable morphology obtained by mixing indium oxide and bismuth oxide with a mass ratio of 20% according to a synthetic process of the invention.
Figure 1C:
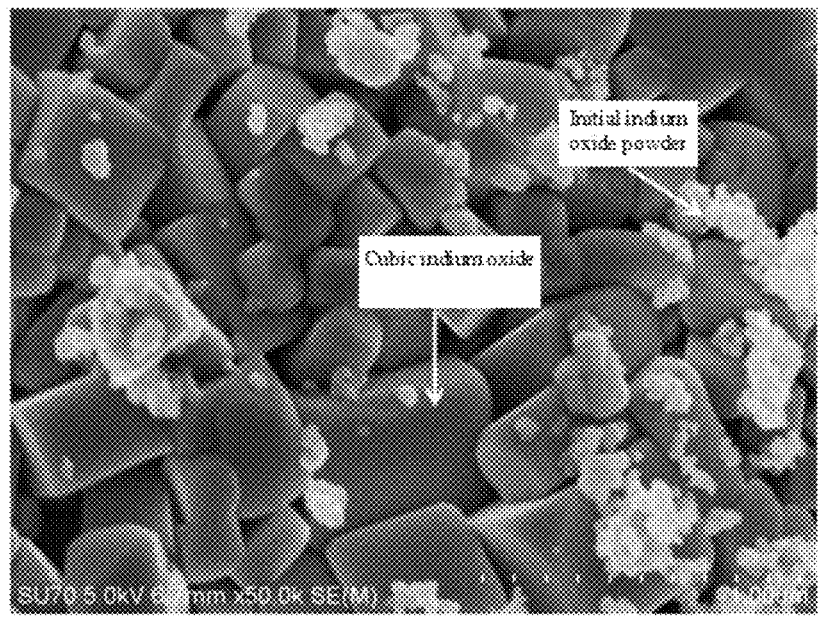
FIG. 1C is a scanning electron microscope picture of indium oxide with cubic stable morphology obtained by mixing indium oxide and bismuth oxide with a mass ratio of 30% according to a synthetic process of the invention.
Figure 1D:
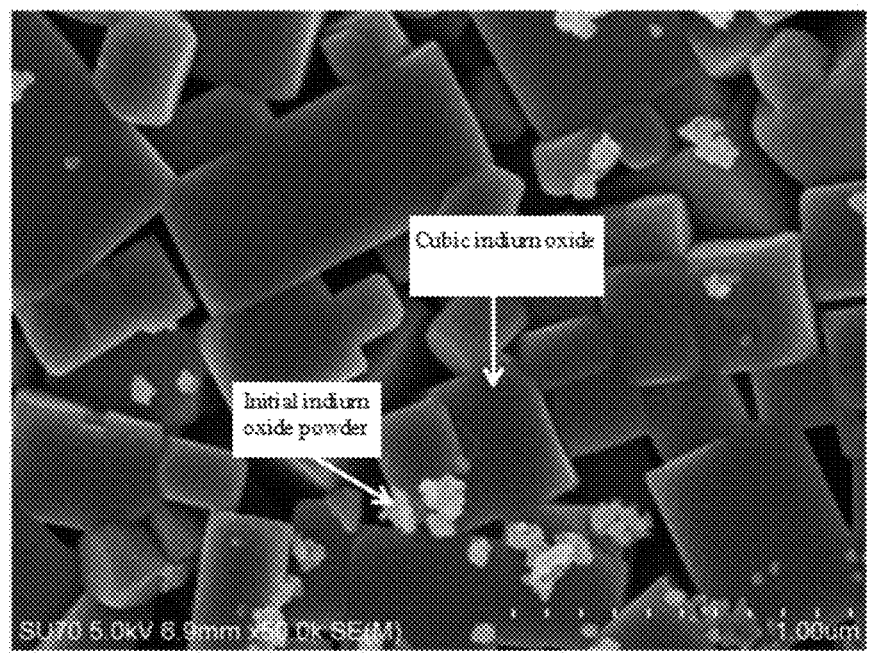
FIG. 1D is a scanning electron microscope picture of indium oxide with cubic stable morphology obtained by mixing indium oxide and bismuth oxide with a mass ratio of 40% according to a synthetic process of the invention.
Figure 1E:
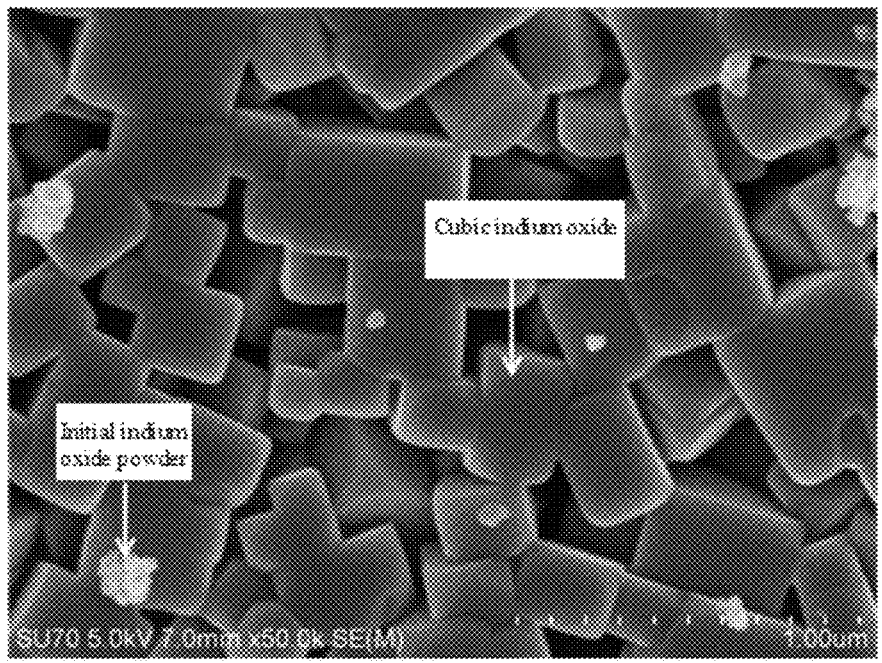
FIG. 1E is a scanning electron microscope picture of indium oxide with cubic stable morphology obtained by mixing indium oxide and bismuth oxide with a mass ratio of 50% according to a synthetic process of the invention.
Figure 1F:
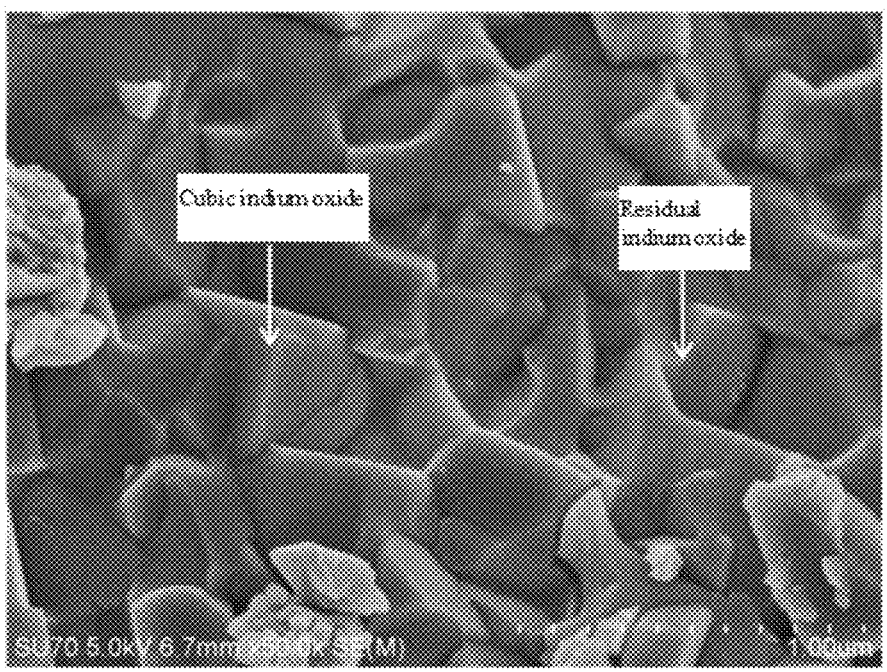
FIG. 1F is a scanning electron microscope picture of rectangular indium oxide with cubic stable morphology obtained by mixing indium oxide and bismuth oxide with a mass ratio of 60% according to a synthetic process of the invention. When the mass ratio of bismuth oxide exceeds 50%, a large amount of bismuth oxide residue appears in the sample, while when the mass ratio of bismuth oxide is less than 50%, the sample is mainly cubic indium oxide.
Figure 2:
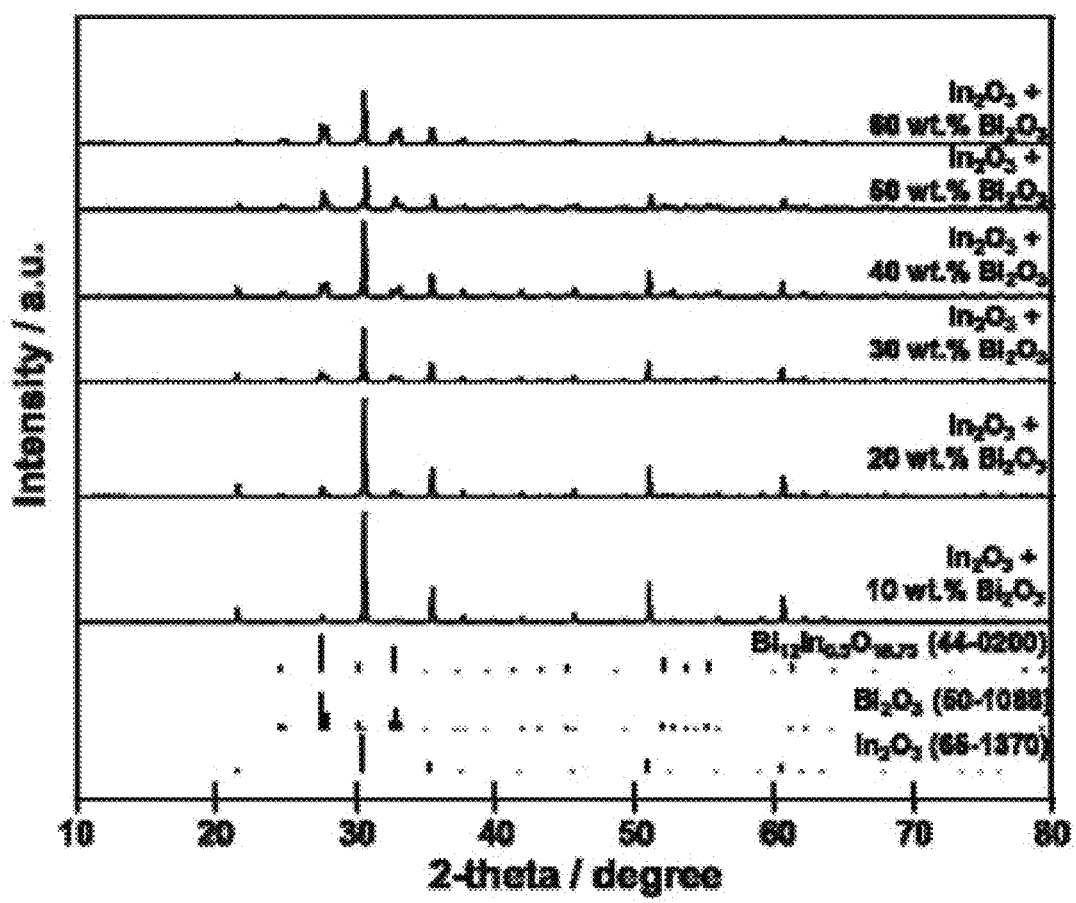
FIG. 2 is an x-ray diffraction graph of a sample obtained by mixing indium oxide and bismuth oxide with a mass ratio of (10-60)% according to a synthetic process of the invention. When the mass ratio of bismuth oxide exceeds 50%, a large amount of bismuth oxide residue appears in the sample, while when the mass ratio of bismuth oxide is less than 50%, the sample is mainly cubic indium oxide.
Figure 3A:
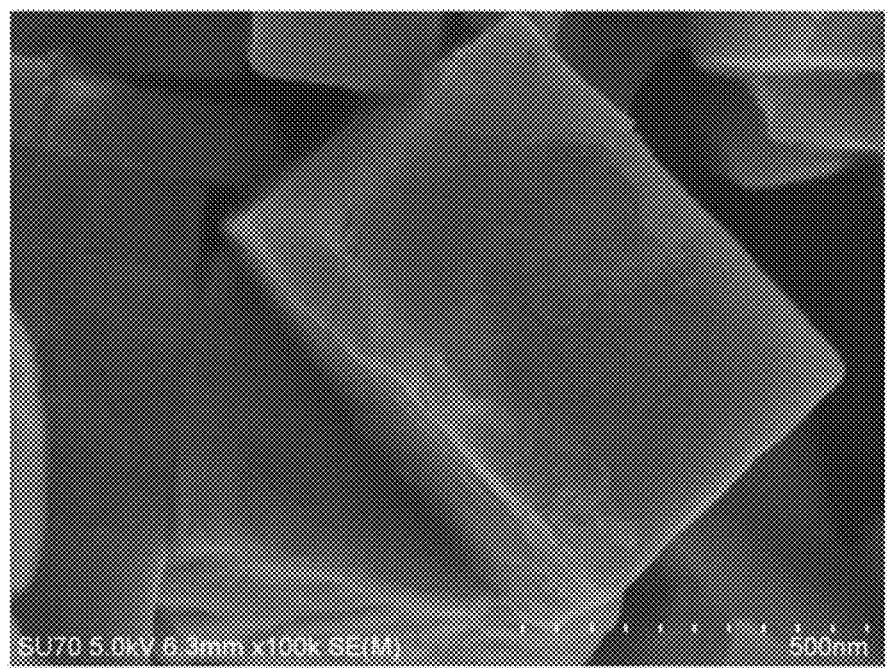
FIG. 3A is a scanning electron microscope picture of indium oxide with cubic morphology synthesized by a conventional hydrothermal synthesis process.
Figure 3B:
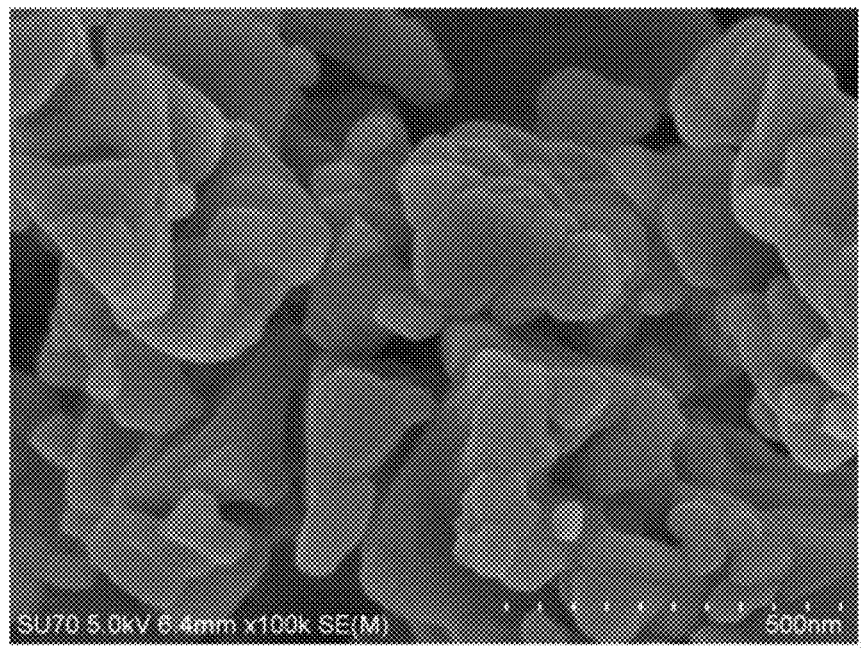
FIG. 3B is a scanning electron microscope picture of the cubic indium oxide synthesized by a conventional hydrothermal synthesis process after being calcined at 700° C. for 2 hours. It can be found that the cubic morphology of indium oxide synthesized by the conventional hydrothermal synthesis process has been destroyed after being heated at 700° C. for 2 hours.
Figure 3C:
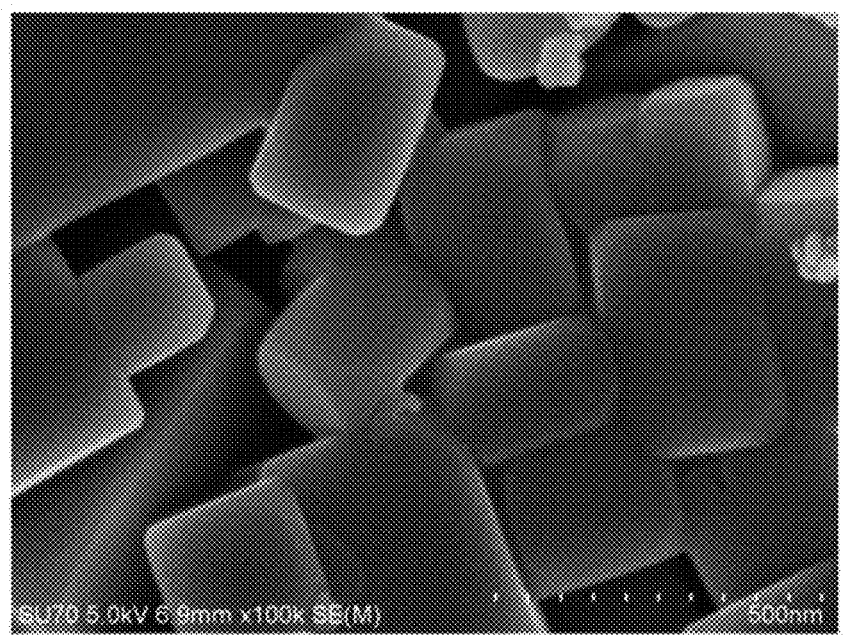
FIG. 3C is a scanning electron microscope picture of indium oxide with cubic stable morphology obtained by a synthesis process of the invention.
Figure 3D:
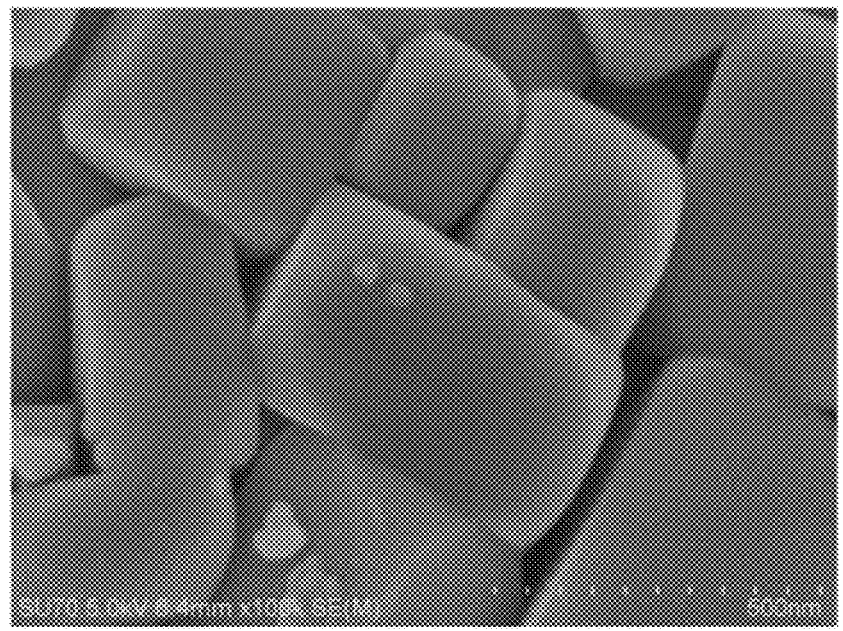
FIG. 3D is a scanning electron microscope picture of indium oxide with cubic stable morphology obtained by a synthesis process of the invention after being calcined at 700° C. for 2 hours. It can be found that the cubic stable morphology of indium oxide obtained by the synthesis process of the invention is maintained after being heated at 700° C. for 2 hours.
Figure 4A:
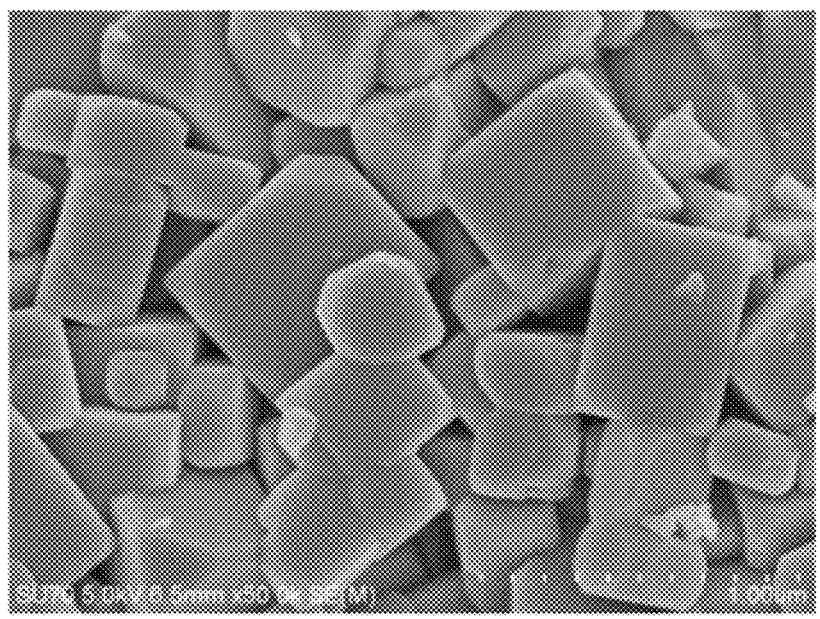
FIG. 4A is a scanning electron microscope picture of indium oxide with cubic stable morphology obtained by a synthesis process of the invention after being calcined at 800° C. for 2 hours. It can be found that the cubic stable morphology of indium oxide obtained by the synthesis process of the invention is maintained after being heated at 800° C. for 2 hours.
Figure 4B:
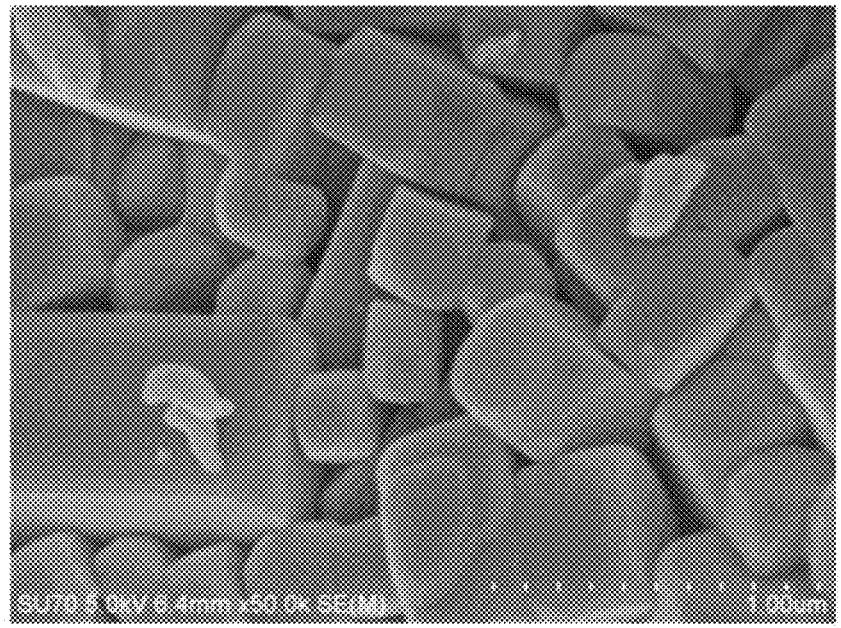
FIG. 4B is a scanning electron microscope picture of indium oxide with cubic stable morphology obtained by a synthesis process of the invention after being calcined at 900° C. for 2 hours. It can be found that the cubic stable morphology of indium oxide obtained by the synthesis process of the invention is maintained after being heated at 900° C. for 2 hours.
Figure 4C:
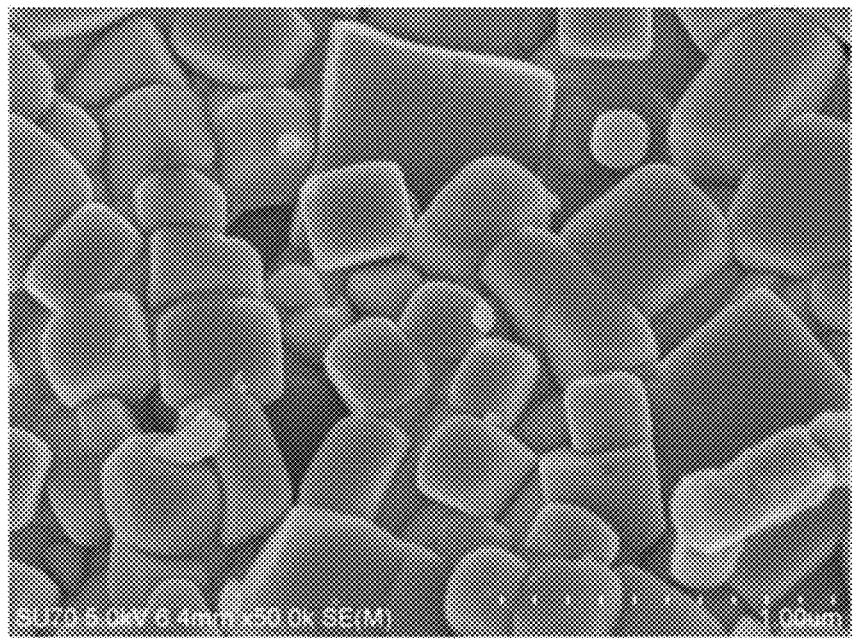
FIG. 4C is a scanning electron microscope picture of indium oxide with cubic stable morphology obtained by a synthesis process of the invention after being calcined at 1000° C. for 2 hours. It can be found that the cubic stable morphology of indium oxide obtained by the synthesis process of the invention is maintained after being heated at 1000° C. for 2 hours.
Figure 4D:
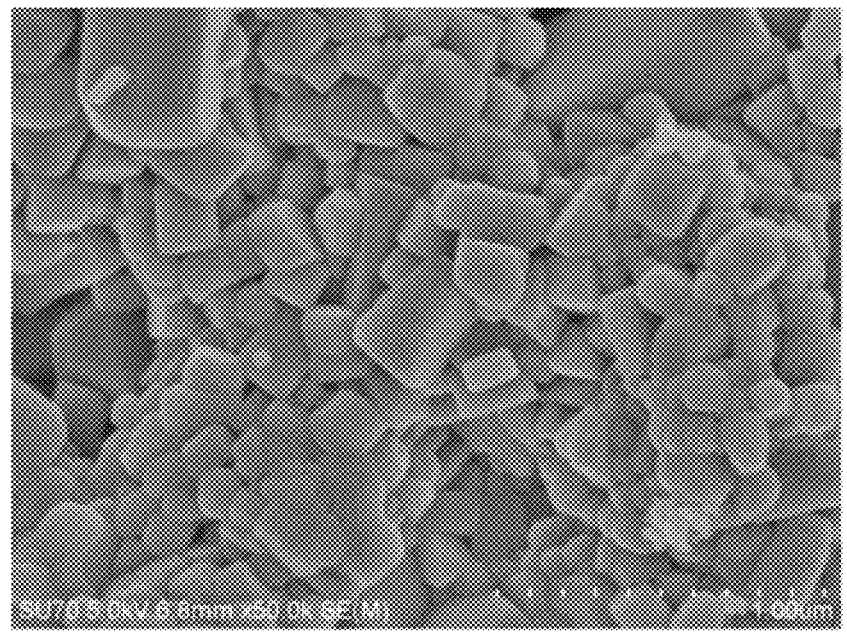
FIG. 4D is a scanning electron microscope picture of indium oxide with cubic stable morphology obtained by a synthesis process of the invention after being calcined at 1100° C. for 2 hours. It can be found that the cubic stable morphology of indium oxide obtained by the synthesis process of the invention has been destroyed after being heated at 1100° C. for 2 hours, indicating that the cubic stable morphology of indium oxide obtained by the synthesis process of the invention can maintain its morphology unchanged after being heated at a temperature equal to or less than 1000° C. for 2 hours.
Figure 5:
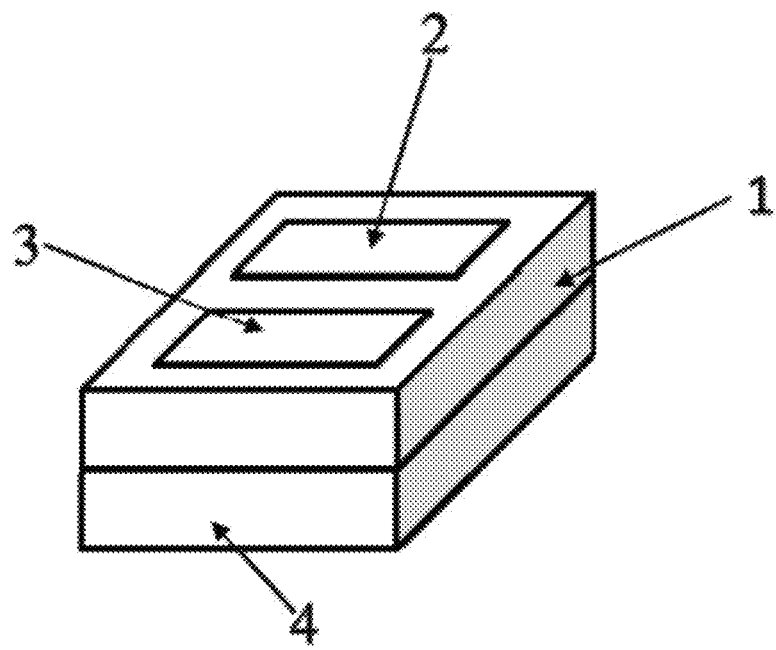
FIG. 5 is a schematic structural diagram of an electrochemical sensor of the invention.
Figure 6:
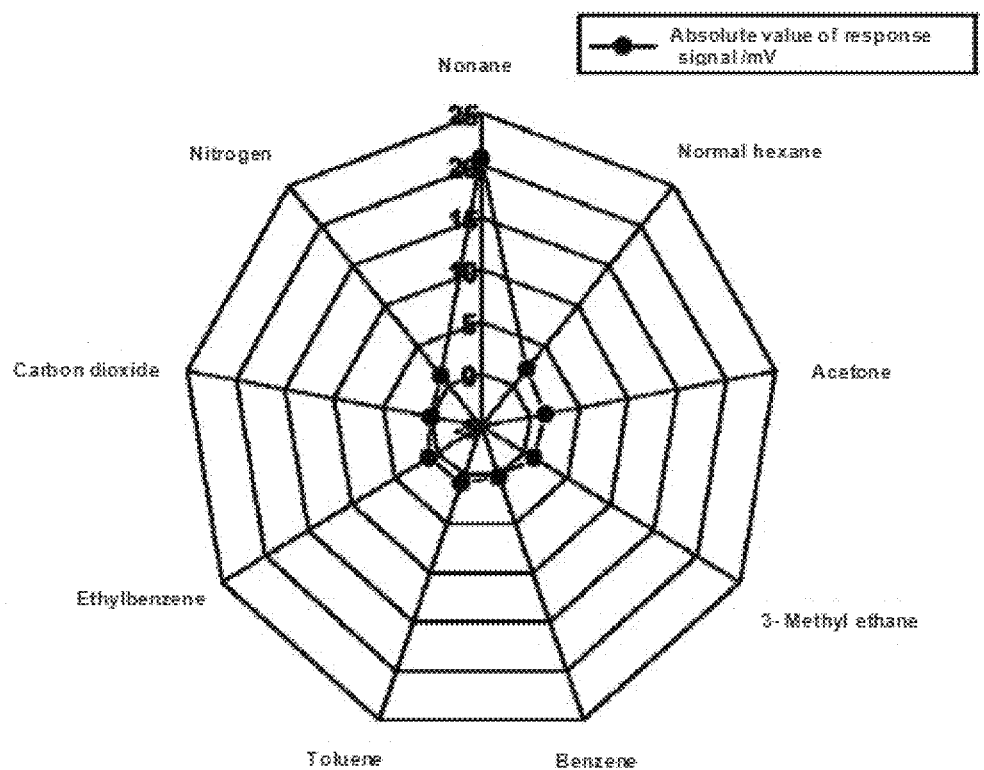
FIG. 6 shows the response graph of an electrochemical sensor to different organic volatile gases, wherein the electrochemical sensor is prepared with cubic indium oxide obtained by mixing commercial indium oxide powder with 30% bismuth oxide, and the results show that the sensor has better selective response to nonane.
Figure 7:
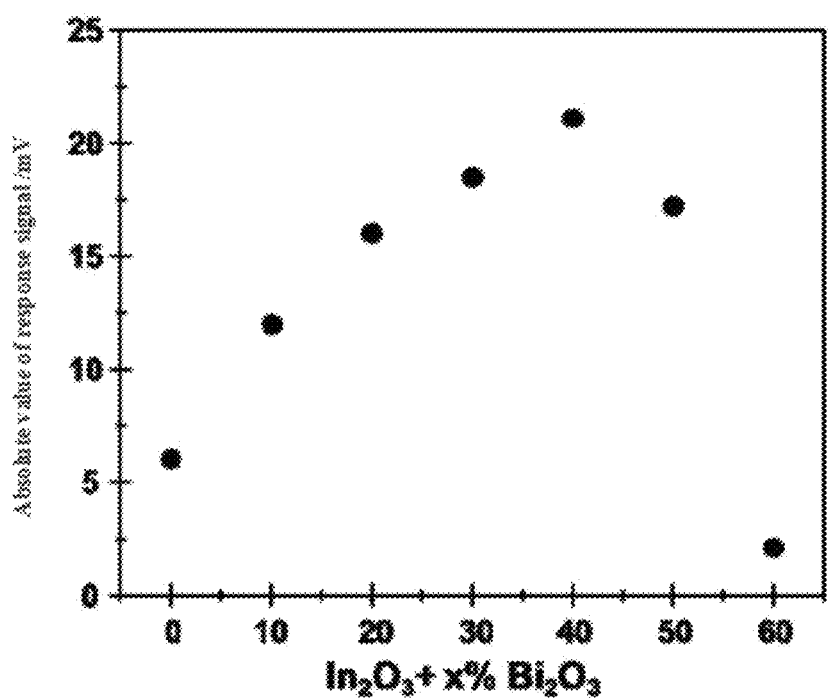
FIG. 7 shows response results of electrochemical sensors to nonane, wherein the electrochemical sensors are prepared with cubic indium oxide obtained by mixing commercial indium oxide powder with X % bismuth oxide, and the results show that cubic indium oxide obtained by mixing commercial indium oxide with bismuth oxide with X=40 has the highest response to nonane.

The invention will be further described in detail with reference to the attached figures and embodiments.

Embodiment 1: A preparation method of indium oxide with stable morphology, may include the following steps:

(1) mixing indium oxide powder and bismuth oxide powder according to a mass ratio of 1:0.1-0.5 to obtain a powder mixture;

(2) putting the powder mixture into a ball mill for ball milling at room temperature for 2.5 hours to obtain a uniform powder mixture;

(3) putting the obtained uniform powder mixture into a muffle furnace and calcining at 700-1000° C. for 1.5 hours;

(4) obtaining the indium oxide with stable morphology after the muffle furnace naturally cools to room temperature.

Embodiment 2: An electrochemical sensor may include: a YSZ solid electrolyte layer 1, a heating plate 4, a reference electrode 2 and a sensitive electrode 3. The reference electrode 2 is made of manganese dioxide, and the heating plate 4 is made of aluminum oxide. Both the YSZ solid electrolyte layer 1 and the heating plate 4 are rectangular, and side lengths of the YSZ solid electrolyte layer 1 and the heating plate 4 are equal. Exemplarily, a length of the YSZ solid electrolyte layer 1 is 1.3 cm-1.7 cm. a width of the YSZ solid electrolyte layer 1 is 0.3 cm-0.5 cm, a thickness of the YSZ solid electrolyte layer is 1 mm-3 mm; the heating plate 4 has a thickness of 1.1 mm-1.5 mm. The lower end face of the YSZ solid electrolyte layer 1 is attached to and fixedly connected to the upper end face of the heating plate 4. The reference electrode 2 and the sensitive electrode 3 are of the same square shape, a length of the reference electrode 2 is 2 mm-3 mm, a width of the reference electrode 2 is 0.3 cm-0.5 mm, and a thickness of the reference electrode 2 is 14 μm-16 μm. The reference electrode 2 and the sensitive electrode 3 are distributed on the upper end face of the YSZ solid electrolyte layer 1 at intervals. The reference electrode 2 is provided with a reference electrode lead (not shown) and the sensitive electrode 3 is provided with a sensitive electrode lead (not shown). The sensitive electrode is made of cubic indium oxide with stable morphology prepared by the method of Embodiment 1.

Embodiment 3: A preparation method of the electrochemical sensor of Embodiment 2, may include the following steps:

(1) preparing the YSZ solid electrolyte layer 1 and the heating plate 4 with corresponding sizes according to design size requirements;

(2) mixing terpineol and ethylcellulose according to a mass ratio of 94:6 to prepare terpineol slurry;

(3) putting a reference electrode material powder and the terpineol slurry into an agate mortar according to a mass ratio of 1:1.5, mixing and grinding uniformly to form first slurry;

(4) printing the first slurry on a design position of the reference electrode on the upper end face of the YSZ solid electrolyte layer 1 according to a design size by adopting a screen printing technology/method to obtain a prototype reference electrode;

(5) putting the product obtained in step (4) into a drying oven, drying at 130° C. for 12 hours, then putting into a sintering furnace, sintering at 1400° C. for 2 hours for molding and subsequently cooling to room temperature to thereby form the reference electrode 2 on the upper end surface of the YSZ solid electrolyte layer 1;

(6) putting the indium oxide with cubic stable morphology and the terpineol slurry according to a mass ratio of 1:1.5 into an agate mortar, mixing and grinding uniformly to form second slurry;

(7) printing the second slurry on a design position of the sensitive electrode on the upper end face of the YSZ solid electrolyte layer 1 according to a design size by adopting a screen printing technology to obtain a prototype sensitive electrode;

(8) spot coating Pt paste on surfaces of the reference electrode and the prototype sensitive electrode, and then leading out the reference electrode lead and the sensitive electrode lead through the Pt paste;

(9) putting the product processed in step (8) into a drying oven, drying for 12 hours at 130° C., then taking out and putting in a sintering furnace, sintering for 2 hours at 900° C. for molding, and taking out for cooling to room temperature to thereby obtain the sensitive electrode; and

(10) placing the heating plate 4 under the YSZ solid electrolyte layer 1 in the product obtained after being processed in step (9), and adhering the heating plate 4 and the YSZ solid electrolyte layer 1 together by adopting a high-temperature resistant adhesive to prepare the electrochemical sensor.

What is claimed is:

1. A method of preparing indium oxide with cubic stable morphology comprising the following steps:
   (1) mixing indium oxide powder and bismuth oxide powder according to a mass ratio of 1:0.1-0.5 to obtain a powder mixture;
   (2) putting the powder mixture into a ball mill for ball milling at room temperature to obtain a uniform powder mixture;
   (3) putting the obtained uniform powder mixture into a muffle furnace and calcining at 700-1000° C.; and
   (4) obtaining the indium oxide with cubic stable morphology after the muffle furnace naturally cools to room temperature.

2. The method of claim 1, wherein time for the ball milling is more than 2 hours, and time for the calcining is more than 1 hour.

3. The method of claim 1 and further comprising preparing an electrochemical sensor comprising a yttria-stabilized zirconia (YSZ) solid electrolyte layer, a heating plate, a reference electrode and a sensitive electrode; wherein a lower end face of the YSZ solid electrolyte layer is attached to and fixedly connected to an upper end face of the heating plate, and the reference electrode and the sensitive electrode are respectively in square shapes with the same size; wherein the reference electrode and the sensitive electrode are distributed on an upper end face of the YSZ solid electrolyte layer at intervals, the reference electrode is provided with a reference electrode lead, the sensitive electrode is provided with a sensitive electrode lead, and the sensitive electrode is made of the indium oxide with cubic stable morphology.

4. The method of claim 3, wherein a material of the reference electrode is manganese dioxide, and a material of the heating plate is alumina.

5. The method of claim 3, wherein both the YSZ solid electrolyte layer and the heating plate are rectangular, and sides of the YSZ solid electrolyte layer and the heating plate are equal in length.

6. The method of claim 5, wherein a length of the YSZ solid electrolyte layer is 1.3 cm-1.7 cm, a width of the YSZ solid electrolyte layer is 0.3 cm-0.5 cm, a thickness of the YSZ solid electrolyte layer is 1 mm-3 mm, a thickness of the heating plate is 1.1 mm-1.5 mm, a length of the reference electrode is 2 mm-3 mm, and a thickness of the reference electrode is 14 μm-16 μm.

7. The method of claim 3, wherein the electrochemical sensor is prepared by a method comprising the following steps:
   (1) preparing the YSZ solid electrolyte layer and the heating plate with corresponding sizes;
   (2) mixing terpineol and ethylcellulose according to a mass ratio of 94:6 to prepare terpineol slurry;
   (3) putting a reference electrode material powder and the terpineol slurry into an agate mortar according to a mass ratio of 1:1.5, mixing and grinding uniformly to form first slurry;
   (4) printing the first slurry on a design position of the reference electrode on the upper end face of the YSZ solid electrolyte layer by using a screen printing method to obtain a prototype reference electrode;
   (5) putting a product obtained in step (4) into a drying oven and drying at 130° C. for 12 hours to obtain a first dried product, then putting the first dried product into a sintering furnace, sintering at 1400° C. for 2 hours for molding and subsequently cooling to room temperature to thereby form the reference electrode on the upper end surface of the YSZ solid electrolyte layer;
   (6) putting the indium oxide with cubic stable morphology and the terpineol slurry according to a mass ratio of 1:1.5 into an agate mortar, mixing and grinding uniformly to form second slurry;
   (7) printing the second slurry on a design position of the sensitive electrode on the upper end face of the YSZ solid electrolyte layer by using a screen printing method to obtain a prototype sensitive electrode;
   (8) spot coating platinum (Pt) paste on surfaces of the reference electrode and the prototype sensitive electrode, and then leading out the reference electrode lead and the sensitive electrode lead through the Pt paste;
   (9) putting a product processed in step (8) into a drying oven, drying for 12 hours at 130° C. to obtain a second dried product, then taking out and putting the second dried product in a sintering furnace, sintering for 2 hours at 900° C. for molding, and taking out for cooling to room temperature to thereby obtain the sensitive electrode; and
   (10) placing the heating plate under the YSZ solid electrolyte layer in a product obtained after being processed in step (9), and adhering the heating plate and the YSZ solid electrolyte layer together by using an adhesive to thereby prepare the electrochemical sensor.

* * * * *